(No Model.)
L. KLING.
PIPE HANGER.
No. 566,690. Patented Aug. 25, 1896.
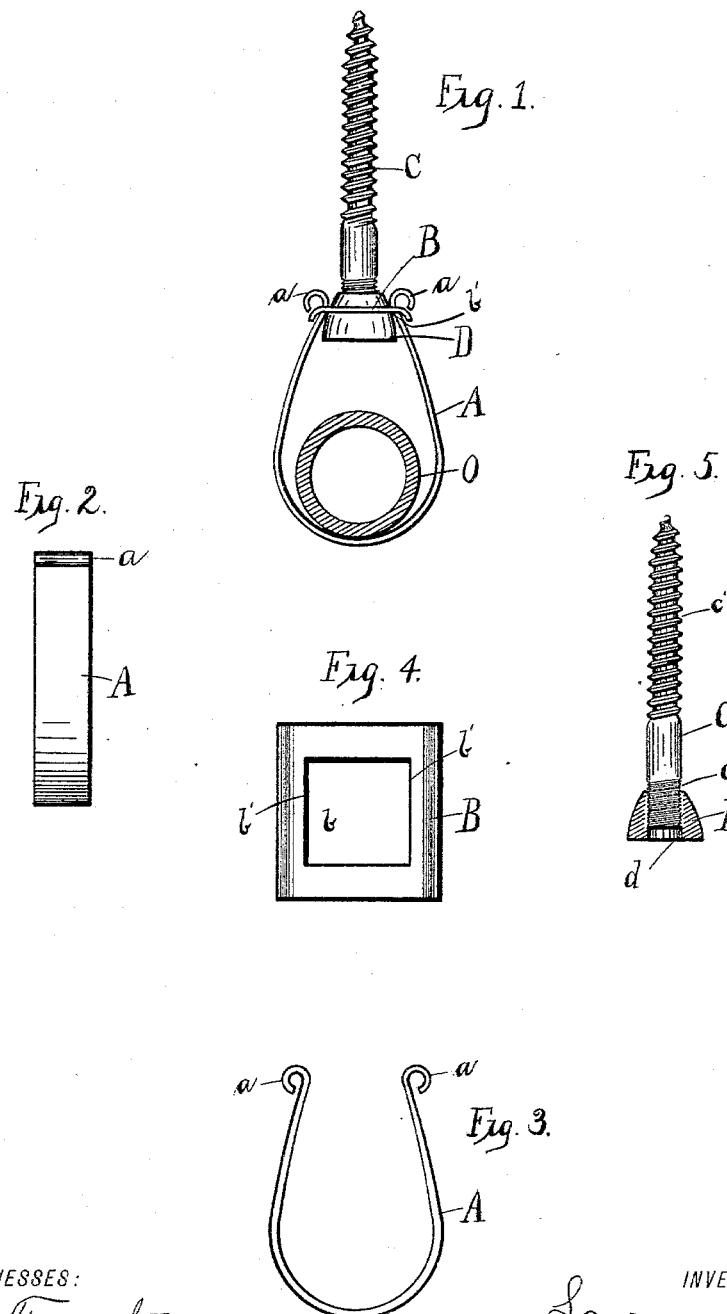
WITNESSES:
F. Philip Farnsworth.
George W. Adams.
INVENTOR
Lawrens Kling
BY Robinson Aiken
ATTORNEYS.

UNITED STATES PATENT OFFICE.

LAURENS KLING, OF NEW HAVEN, CONNECTICUT.

PIPE-HANGER.

SPECIFICATION forming part of Letters Patent No. 566,690, dated August 25, 1896.

Application filed May 18, 1896. Serial No. 591,955. (No model.)

*To all whom it may concern:*

Be it known that I, LAURENS KLING, a citizen of the United States, and a resident of the city and county of New Haven, in the State of Connecticut, have invented a new and useful Improvement in Pipe-Hangers, fully set forth and described in the following specification, taken in connection with the accompanying drawings, which form a part thereof, and in which—

Figure 1 represents a side elevation of a pipe-hanger embodying my invention. Figs. 2 and 3 are end and side elevations of the spring-support, respectively. Fig. 4 is a top view of the clamp; and Fig. 5 is a view partly in elevation, partly in section, of the bolt and wedge.

In all figures similar letters of reference represent like parts.

This invention relates to pipe-hangers, and has for its object the production of a novel form of hanger composed of parts simple in construction, the whole being easily adjusted for a pipe.

The invention consists in a spring-support adapted to surround the pipe, a clamp and conical wedge for holding the spring-support in place to secure the pipe, as more fully set forth and described hereinafter, together with minor improvements.

Referring to the drawings for a more particular description, A represents a U-shaped spring-support formed of a single strip of sheet metal, steel, or other suitable material of slight elasticity, the extreme ends $a$ being rolled or otherwise formed to constitute outwardly-extending lateral engaging flanges.

A clamp B, consisting of a flat piece of metal, is provided with a rectangular slot $b$ in its center, the edges $b'$ of which are of slightly greater width than the ends of the support A.

A bolt C, the upper end of which, $c'$, is threaded to be screwed into rafters or other objects, as desired, is also threaded at its other end $c$ to receive a frusto-conical wedge D, internally bored or threaded, as shown at $d$, Fig. 5.

With these parts the operation of the device is as follows: The clamp B is placed over the bolt C, and as the wedge D is greater in diameter than the slot $b$ the clamp is held on the bolt when the wedge is screwed onto the bolt and the end $c'$ of the bolt is secured to any object. The spring-support is placed around the pipe O, Fig. 1, and its ends inserted in the slot $b$ of the clamp B. The elasticity of the support tends to force the ends apart, so that the flanges $a$ engage over the edges $b'$ of the clamp. As the weight of the pipe draws the spring-support and clamp downward the wedge D is forced tightly between the ends of the support, thereby preventing the flanges $a$ from slipping off the edges $b'$. Obviously increased weight in the pipe O will make the engagement between the wedge and the ends of the spring-support more secure. The form of the wedge and its method of engagement with the support and clamp constitute practically a ball-and-socket joint.

Having now described my invention, what I claim, and desire to secure by Letters Patent, is—

1. A pipe-hanger consisting of a U-shaped spring-support with lateral engaging flanges; a clamp having a slot through which the ends of said support may extend to permit said flanges to engage with the edges of said slot; and a wedge adapted to fit between the ends of said support when in said slot, and be secured to a bolt or other article, substantially as described.

2. In a pipe-hanger, the combination with a U-shaped spring-support having outwardly-extending lateral engaging flanges; of a clamp having a rectangular central slot in which the ends of said support may extend; a bolt extending through said slot in said clamp; and a frusto-conical wedge, internally threaded to be secured to said bolt, and adapted to fit between the ends of said support when in said slot, substantially as described.

In witness whereof I have hereunto set my hand, at New Haven, in the county of New Haven, State of Connecticut, this 16th day of May, 1896.

LAURENS KLING.

Witnesses:
GEORGE W. ROBINSON,
F. PHILIP FARNSWORTH.